US012602031B2

(12) United States Patent
Chen et al.

(10) Patent No.: US 12,602,031 B2
(45) Date of Patent: Apr. 14, 2026

(54) METHOD AND APPARATUS FOR PROCESSING TAKT AT STATION, AND STORAGE MEDIUM

(71) Applicant: GUANGZHOU MINO EQUIPMENT CO., LTD., Guangzhou (CN)

(72) Inventors: Minqi Chen, Guangzhou (CN); Xiaojiang Ren, Guangzhou (CN); Weile Jiang, Guangzhou (CN); Zhijun Zuo, Guangzhou (CN); Yi He, Guangzhou (CN)

(73) Assignee: GUANGZHOU MINO EQUIPMENT CO., LTD., Guangzhou (CN)

( * ) Notice: Subject to any disclaimer, the term of this patent is extended or adjusted under 35 U.S.C. 154(b) by 455 days.

(21) Appl. No.: 18/182,513

(22) Filed: Mar. 13, 2023

(65) Prior Publication Data

US 2023/0229149 A1    Jul. 20, 2023

Related U.S. Application Data

(63) Continuation of application No. PCT/CN2022/089844, filed on Apr. 28, 2022.

(30) Foreign Application Priority Data

Apr. 30, 2021    (CN) .......................... 202110486108.6

(51) Int. Cl.
*G05B 19/418*        (2006.01)
(52) U.S. Cl.
CPC ................. *G05B 19/41865* (2013.01); *G05B 2219/31368* (2013.01)
(58) Field of Classification Search
None
See application file for complete search history.

(56) References Cited

U.S. PATENT DOCUMENTS 5,731,572 A * 3/1998 Winn ........................ G06G 1/12
                                                    235/70 R
7,280,880 B2 * 10/2007 Schmale ................ G06Q 10/06
                                                    700/99

(Continued)

FOREIGN PATENT DOCUMENTS

CN        103246228 A        8/2013
CN        106897941 A        6/2017

(Continued)

OTHER PUBLICATIONS

First Office Action issued in counterpart Chinese Patent Application No. 202110486108.6, dated Jan. 24, 2022.
International Search Report issued in corresponding PCT Application No. PCT/CN2022/089844, dated Jun. 29, 2022.

(Continued)

*Primary Examiner* — Jason Lin
(74) *Attorney, Agent, or Firm* — Westbridge IP LLC

(57) ABSTRACT

A method for processing a takt at a station includes: obtaining takt data of each station within a preset time period, and determining a takt boxplot of each station according to the takt data; obtaining a material blocking time, a material shortage time and a failure time in each takt, determining an effective takt of each station based on the takt data, the material blocking time, the material shortage time and the failure time, and determining an effective takt mode; obtaining planning takt data of each station, generating a station takt wall station based on the takt boxplot, the effective takt mode and the planning takt data; determining a takt fluctuation status and a bottleneck of each station according to the station takt wall. A system for processing a takt at a station, an apparatus, and a storage medium are also disclosed.

17 Claims, 3 Drawing Sheets

(56) References Cited

U.S. PATENT DOCUMENTS

| | | | | |
|---|---|---|---|---|
| 7,489,976 | B2 * | 2/2009 | Adra | G06Q 10/00 |
| | | | | 703/2 |
| 7,599,755 | B2 * | 10/2009 | Adra | G05B 13/041 |
| | | | | 700/109 |
| 8,055,371 | B2 * | 11/2011 | Sanford | G05B 23/0245 |
| | | | | 700/36 |
| 8,423,168 | B2 * | 4/2013 | Nonaka | G05B 19/4184 |
| | | | | 700/99 |
| 8,942,838 | B2 * | 1/2015 | Stahley | G06F 17/00 |
| | | | | 702/182 |
| 11,501,388 | B2 * | 11/2022 | Saneyoshi | G06Q 50/04 |
| 2002/0026257 | A1 * | 2/2002 | Newmark | G05B 19/41805 |
| | | | | 700/51 |
| 2006/0061547 | A1 * | 3/2006 | Bramwell | G06Q 10/06 |
| | | | | 702/179 |
| 2007/0198135 | A1 * | 8/2007 | Chang | G05B 19/4184 |
| | | | | 700/300 |
| 2017/0153625 | A1 * | 6/2017 | Yamamoto | G05B 19/4184 |
| 2018/0150575 | A1 | 5/2018 | Kitagawa | |

FOREIGN PATENT DOCUMENTS

| | | | |
|---|---|---|---|
| CN | 107065793 | A | 8/2017 |
| CN | 107329415 | A | 11/2017 |
| CN | 107506885 | A | 12/2017 |
| CN | 108776831 | A | 11/2018 |
| CN | 110852617 | A | 2/2020 |
| CN | 111178660 | A | 5/2020 |
| CN | 111913449 | A | 11/2020 |
| CN | 112288175 | A | 1/2021 |
| CN | 112329981 | A | 2/2021 |
| CN | 113219921 | A | 8/2021 |

OTHER PUBLICATIONS

Written Opinion issued in corresponding PCT Application No. PCT/CN2022/089844, dated Jun. 29, 2022.

Zhou et al., Co-scheduling of mobile robots in mixed-model assembly lines, Control and Decision, vol. 33, No. 11, pp. 1959-1966, dated Apr. 13, 2018.

* cited by examiner

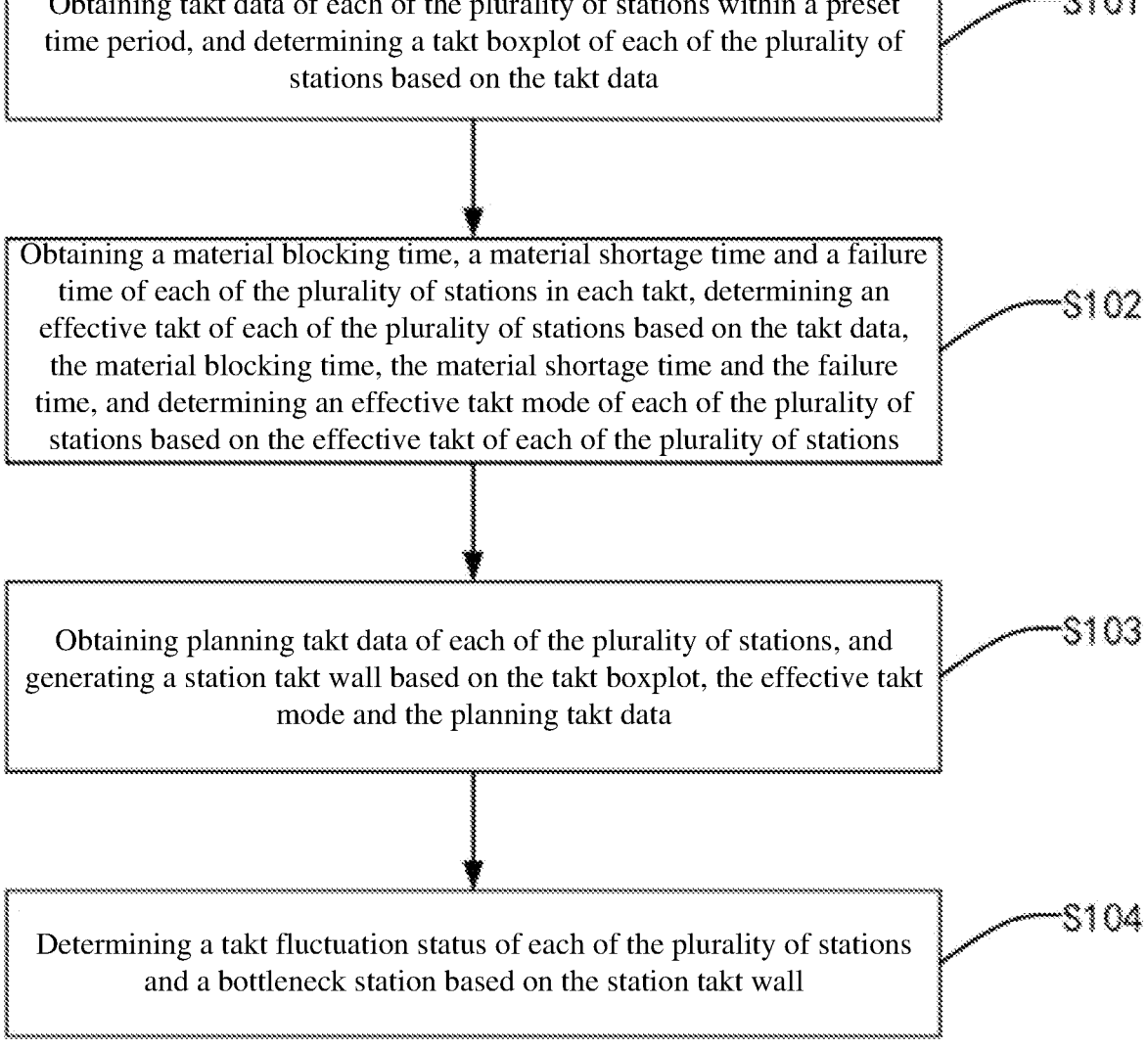

Obtaining takt data of each of the plurality of stations within a preset time period, and determining a takt boxplot of each of the plurality of stations based on the takt data    S101

Obtaining a material blocking time, a material shortage time and a failure time of each of the plurality of stations in each takt, determining an effective takt of each of the plurality of stations based on the takt data, the material blocking time, the material shortage time and the failure time, and determining an effective takt mode of each of the plurality of stations based on the effective takt of each of the plurality of stations    S102

Obtaining planning takt data of each of the plurality of stations, and generating a station takt wall based on the takt boxplot, the effective takt mode and the planning takt data    S103

Determining a takt fluctuation status of each of the plurality of stations and a bottleneck station based on the station takt wall    S104

FIG. 1

METHOD AND APPARATUS FOR PROCESSING TAKT AT STATION, AND STORAGE MEDIUM

CROSS-REFERENCE TO RELATED APPLICATIONS

This application is a continuation of International Application No. PCT/CN2022/089844 filed on Apr. 28, 2022, which claims priority to Chinese Patent Application 202110486108.6, filed on Apr. 30, 2021. Both applications are incorporated herein by reference in their entireties.

TECHNICAL FIELD

The application relates to the field of production process technologies, in particular, to a method, a system, and an apparatus for processing a takt at a station, and a storage medium.

BACKGROUND

At present, the takt statistics of various stations in the manufacturing industry are generally still relatively backward. Enterprises that have not realized automation usually lack an automated takt statistics method. The method of counting takts is often done by manually counting, recording videos, etc., and after several takts are counted, an average value or another characteristic value is calculated as the takt of the station based on experience. In the case of automation, the current common practice is to perform takt statistics through PLC (Programmable logic controller). From the beginning of the station to the end of the station, a number of process cycles are accumulated and counted, and then the eigenvalue calculation is performed manually to obtain the takt of the station.

The station takt obtained by the existing takt statistics method can only count the average value of the station takt within a period of time, and cannot accurately reflect the fluctuation range of the station takt, failing to truly reflect the real situation of production or locate the bottleneck station. This makes it impossible for manufacturers to adjust and optimize the process according to the actual production situation, which is not conducive to reducing production costs and limits the improvement of production efficiency and production quality.

Terminology Explanation:

PLC: Programmable logic controller, is a digital operation operating electronic system specially designed for application in industrial environment. The PLC uses a programmable memory to store instructions for performing operations such as logic operations, sequence control, timing, counting and arithmetic operations, and control various types of mechanical equipment or production processes through digital or analog input and output.

Station: A production line is divided into a plurality of stations, and each station is a fixed area for processing a specific process.

CYCLE: Process cycle, refers to the cycle from the first process to the last process that is repeated in a station.

Takt: The time it takes for a station to complete a process cycle.

Material blocking: A case that production of a workpiece at the current station is completed, and the workpiece is waited to be transported to the next station after the ongoing processing at the next station is completed.

Material shortage: A case that processing of the current station is completed, and a workpiece is waited to be transported to the current station after the processing at the previous station is completed.

Boxplot: A statistical graph used to display the dispersion of a set of data, named for its shape like a box, which is often used in various fields, often in quality management. It is mainly used to reflect the characteristics of the original data distribution, and can also be used to compare the distribution characteristics of a plurality of sets of data.

Mode: It refers to a value with a clear central tendency point in the statistical distribution, representing the general level of the data.

SUMMARY

The purpose of the present application is to resolve one of the technical problems existing in the prior art at least to a certain extent.

To this end, the present application provides a method, a system, an apparatus for processing a takt at a station and a storage medium. According to the technical scheme of the present application, the fluctuation range of the station takt can be accurately reflected, the accuracy of the station takt statistical result can be greatly improved, and the bottleneck station can be accurately positioned, meeting the needs of manufacturers to improve production quality and production efficiency and reduce production costs.

According to a first aspect of the present application, a method for processing a takt at a station is provided, including the following steps: obtaining takt data within a preset time period indicating a takt of each of a plurality of stations arranged in a predetermined station sequence; determining a takt boxplot of each of the plurality of stations based on the takt data; obtaining a material blocking time, a material shortage time and a failure time of each of the plurality of stations in each takt; determining an effective takt of each of the plurality of stations based on the takt data, the material blocking time, the material shortage time and the failure time; determining an effective takt mode of each of the plurality of stations based on the effective takt of each of the plurality of stations; obtaining planning takt data indicating a planning takt of each of the plurality of stations; generating a station takt wall based on the takt boxplot, the effective takt mode and the planning takt data; and determining a takt fluctuation status of each of the plurality of stations based on the station takt wall and a bottleneck station; the station takt wall presents a takt boxplot sequence, an effective takt mode sequence and a planning takt data sequence in a predetermined coordinate system, the predetermined coordinate system is composed of an abscissa representing a station and an ordinate representing a takt duration.

In an embodiment of the present application, the obtaining takt data of each of the plurality of stations within the preset time period includes: obtaining production action data including a time indicating an initial production action of each of the plurality of stations within the preset time period; determining a plurality of pieces of takt data of each of the plurality of stations based on an interval time between adjacent initial production actions.

In an embodiment of the present application, the determining a takt boxplot of each of the plurality of stations based on the takt data includes: determining an upper whisker, an upper quartile, a median, a lower quartile and a lower whisker of the takt data of each of the plurality of stations; determining the takt boxplot of each of the plurality of stations based on the upper whisker, the upper quartile, the median, the lower quartile, and the lower whisker.

In an embodiment of the present application, the determining an effective takt of each of the plurality of stations based on the takt data, the material blocking time, the material shortage time and the failure time includes: obtaining the effective takt by subtracting the material blocking time, the material shortage time and the failure time in a takt from the corresponding takt indicated by the takt data.

In an embodiment of the present application, the determining an effective takt mode of each of the plurality of stations based on the effective takt of each of the plurality of stations includes: determining an effective takt having a highest frequency in the effective takt of each of the plurality of stations as an effective takt mode of the corresponding station.

In an embodiment of the present application, the generating a station takt wall based on the takt boxplot, the effective takt mode and the planning takt data includes: determining the takt boxplot sequence based on the takt boxplot of each of the plurality of stations and the station sequence; determining the effective takt mode sequence based on the effective takt mode of each of the plurality of stations and the station sequence; determining the planning takt data sequence based on the planning takt data of each of the plurality of stations and the station sequence; generating a station takt wall in the predetermined coordinate system based on the takt boxplot sequence, the effective takt mode sequence and the planning takt data sequence.

In an embodiment of the present application, the determining a takt fluctuation status of each of the plurality of stations and a bottleneck station based on the station takt wall includes: determining the takt fluctuation status of each of the plurality of stations in the station takt wall by comparing the takt boxplot with the planning takt data of each of the plurality of stations.

In an embodiment of the present application, the determining a takt fluctuation status of each of the plurality of stations and a bottleneck station based on the station takt wall includes: determining whether each of the plurality of stations is a bottleneck station in the station takt wall by comparing the effective takt mode with the planning takt data of each of the plurality of stations.

According to a second aspect of the present application, a system for processing a takt at a station is provided, including: a takt boxplot determination module, configured to obtain takt data within a preset time period indicating a takt of each of the plurality of stations arranged in a predetermined station sequence, and determine a takt boxplot of each of the plurality of stations based on the takt data; an effective takt mode determination module, configured to obtain a material blocking time, a material shortage time and a failure time in each takt of each of the plurality of stations, determine an effective takt of each of the plurality of stations based on the takt data, the material blocking time, the material shortage time and the failure time, and determine the effective takt mode based on the effective takt of each of the plurality of stations; a station takt wall generation module, configured to obtain planning takt data indicating a planning takt of each of the plurality of stations, and generate a station takt wall based on the takt boxplot, the effective takt mode and the planning takt data, where the station takt wall presents the takt boxplot sequence, the effective takt mode sequence and the planning takt data sequence in a predetermined coordinate system, the predetermined coordinate system is composed of an abscissa representing a station and an ordinate representing a takt duration; a fluctuation status and bottleneck station determination module, configured to determine a takt fluctuation status of each of the plurality of stations and a bottleneck station based on the station takt wall.

In an embodiment of the present application, the effective takt mode determination module includes: an effective takt calculation unit, configured to subtract the material blocking time, the material shortage time and the failure time in a takt from the corresponding takt indicated by the takt data to obtain the effective takt.

In an embodiment of the present application, the effective takt mode determination module includes: an effective takt mode statistical unit, configured to determine an effective takt having a highest frequency in the effective takt of each of the plurality of stations as an effective takt mode of the corresponding station.

In an embodiment of the present application, the fluctuation status and bottleneck station determination module includes: a fluctuation status determination unit, configured to determine the takt fluctuation status of each of the plurality of stations in the station takt wall by comparing a takt boxplot with a planning takt data of each of the plurality of stations.

In an embodiment of the present application, the fluctuation status and bottleneck station determination module includes: a bottleneck station determination unit, configured to determine whether each of the plurality of stations is a bottleneck station in the station takt wall by comparing the effective takt mode with the planning takt data of each of the plurality of stations.

According to a third aspect of the present application, an apparatus for processing a takt at a station is provided, including: at least one processor; at least one memory storing at least one program; when the at least one program is executed by the at least one processor, the at least one processor is caused to implement the method for processing a takt at a station according to the first aspect.

According to a fourth aspect of the present application, a non-volatile computer-readable storage medium on which processor-executable instructions are stored is provided, the processor-executable instructions, when executed by the processor, are used to execute the method for processing a takt at a station according to the first aspect.

The advantages and beneficial effects of the present application will be given in the following description, and in part will become apparent from the following description, or be learned by practice of the present application:

In the technical solution according to the present application, the takt data of each station within the preset time period is obtained, and the takt boxplot is determined based on the takt data of each station, and then the material blocking time, material shortage time and failure time of each station in each takt are obtained to calculate the effective takt of each station and determine the effective takt mode, then the planning takt data pre-planned by each station is obtained, and the station takt wall is obtained based on the takt boxplot, effective takt mode and planning takt data of each station, so that the takt fluctuation status of each station and the bottleneck station can be determined according to the station takt wall. According to the technical scheme of the present application, the fluctuation range of the station takt can be accurately reflected, the accuracy of the station takt statistical result can be greatly improved, and the bottleneck station can be accurately positioned, meeting the needs of manufacturers to improve production quality and production efficiency and reduce production costs.

BRIEF DESCRIPTION OF THE DRAWINGS

In order to explain the technical solutions in the embodiments of the present application more clearly, the following descriptions are given to the accompanying drawings that are used in the embodiments of the present application. It should be understood that the accompanying drawings in the following introduction are only for the convenience of clearly expressing the technology of the present application. For some of the embodiments in the solution, for those skilled in the art, other drawings can also be obtained from these drawings without the need for creative work.

FIG. 1 is a flowchart of a method for processing a takt at a station according to an embodiment of the present application.

DETAILED DESCRIPTION OF THE EMBODIMENTS

Figure 2:
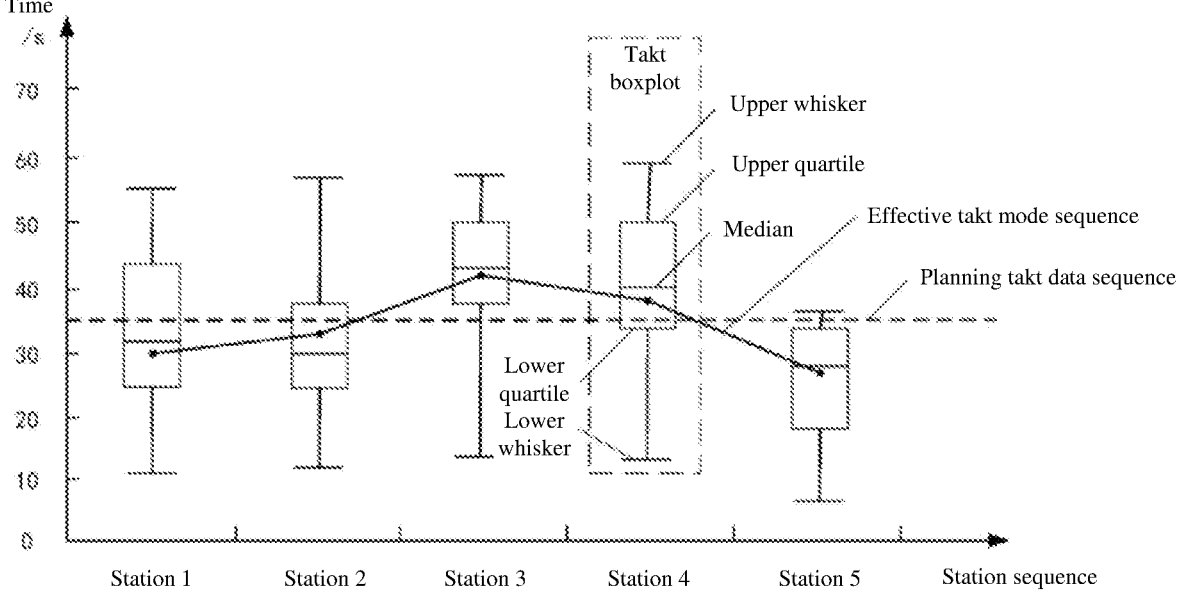
FIG. 2 is a schematic diagram of a station takt wall generated according to an embodiment of the present application.

The following describes the examples of the present application in detail, examples of which are illustrated in the accompanying drawings, the same or similar reference numerals refer to the same or similar elements or elements having the same or similar functions. The examples described below with reference to the accompanying drawings are exemplary, only used to explain the present application, and should not be construed as a limitation of the present application. The numbers of the steps in the following examples are only arranged for the convenience of description, and the sequence between the steps is not limited in any way, and the execution sequence of each step in the examples can be adapted according to the understanding of those skilled in the art.

In the description of the present application, the meaning of "a plurality of" is two or more. If the words of first and second are described, they are only for the purpose of distinguishing technical features, and should not be understood as indicating or implying relative importance or implicit indicating the number of the indicated technical features or implicitly indicates the order of the indicated technical features. Also, unless otherwise defined, all technical and scientific terms used herein have the same meaning as commonly understood by one of ordinary skill in the art.

Referring to FIG. 1, a method for processing a takt at a station according to an example of the present application is shown. The method for processing a takt at a station is used to process the takt of a plurality of stations arranged in a predetermined station sequence. The method for processing a takt at a station includes the following steps:

S101: Obtaining takt data of each of the plurality of stations within a preset time period, and determining a takt boxplot of each of the plurality of stations based on the takt data.

Specifically, the takt data indicates the takt, and the takt boxplot indicates a fluctuation of the actual takt, including a maximum takt, a minimum takt, an upper quartile takt, a lower quartile takt and a median takt within the preset time period. Step S101 specifically includes the following steps.

S1011: Obtaining production action data including a time indicating an initial production action of each of the plurality of stations within the preset time period, and determining a plurality of pieces of takt data of each of the plurality of stations based on an interval time between adjacent initial production actions.

S1012: Determining an upper whisker, an upper quartile, a median, a lower quartile, and a lower whisker of the takt data of each of the plurality of stations, and determining the takt boxplot of each of the plurality of stations based on the upper whisker, the upper quartile, the median, the lower quartile, and the lower whisker.

Specifically, an upper computer is used to collect millisecond-level data on PLC-controlled process equipment actions and station status, and a CYCLE time sequence Gantt chart is drawn according to the collected data. A duration from a first action of each station CYCLE (a first initial production action of a process) to next first action is recorded as a takt of the station, thus a plurality of pieces of takt data (actual takt) is obtained; for the same station, determine the upper whisker (a maximum value), lower whisker (a minimum value), median (a value in the middle after a set of data is sorted by size), and the upper and lower quartiles in its takt data, and then the two quartiles are connected to draw the box, and then the upper whisker and lower whisker are connected to the box, and the median is in the middle of the box, so as to get the takt boxplot of the station.

Optionally, the takt data of a station can be arranged in ascending order, the minimum value is taken as the lower whisker, the maximum value is taken as the upper whisker, and the value in the middle of the arrangement is taken as the median; if the generated takt data has even numbers, the median is not unique, and an average of two middlemost values can be taken as the median; similarly, a value arranged in a quarter position is taken as the lower quartile, and a value arranged in a third quarter position is taken as the upper quartile.

S102: Obtaining a material blocking time, a material shortage time and a failure time of each of the plurality of stations in each takt, determining an effective takt of each of the plurality of stations based on the takt data, the material blocking time, the material shortage time and the failure time, and determining an effective takt mode of each of the plurality of stations based on the effective takt of each of the plurality of stations.

Specifically, a material blocking, a material shortage or a failure may occur in a takt. Therefore, it is necessary to obtain the material blocking time, material shortage time and failure time in each takt in order to accurately count the effective takt of each of the plurality of stations. Step S102 specifically includes the following steps.

S1021: Obtaining the material blocking time, the material shortage time and the failure time of each of the plurality of stations in each takt.

S1022: Obtaining the effective takt by subtracting the material blocking time, the material shortage time and the failure time in a takt from the corresponding takt indicated by the takt data.

S1023: Determining an effective takt having a highest frequency in the effective takt of each of the plurality of stations as an effective takt mode of the corresponding station.

Specifically, the effective takt=the takt data–the failure time–the material blocking time–the material shortage time, after a plurality of effective takt of a station are calculated, a value having the highest frequency in the effective takt is counted as the effective takt mode. For example, a piece of actual takt data of a certain process cycle of a station is 60 s, and there are 2 s of material shortage and 5 s of material blockage during the process cycle, and there is no fault, then the corresponding effective takt is 60–2–5=53 s, the effective takt of the station within the preset time are calculated by analogy. If the calculated effective takts are 53 s, 53.2 s, 53.5 s, 54 s, 52 s, 53 s, 58 s, 57 s, 56 s, 56 s, 53 s, take a value having the highest frequency of 53 s as the effective takt mode.

S103: Obtaining planning takt data of each of the plurality of stations, and generating a station takt wall based on the takt boxplot, the effective takt mode and the planning takt data.

Specifically, the planning takt data indicates planning takt. The planning takt is a theoretical planning duration of the takt of the station. By forming the station takt wall, an actual takt, theoretical planning takt and effective takt of each station can be compared, so as to truly reflect the actual production status of each station. The station takt wall presents the takt boxplot sequence, the effective takt mode sequence and the planning takt data sequence in a predetermined coordinate system consisting of an abscissa representing the station and an ordinate representing a takt duration.

As a further optional implementation, the step of generating a station takt wall based on the takt boxplot, the effective takt mode and the planning takt data specifically includes the following steps.

A1: Determining the takt boxplot sequence based on the takt boxplot of each of the plurality of stations and the station sequence.

A2: Determining the effective takt mode sequence based on the effective takt mode of each of the plurality of stations and the station sequence.

A3: Determining the planning takt data sequence based on the planning takt data of each of the plurality of stations and the station sequence.

A4: Generating a station takt wall based on the takt boxplot sequence, the effective takt mode sequence and the planning takt data sequence.

Specifically, FIG. 2 is a schematic diagram of a station takt wall generated according to an example of the present application. The example of the present application reflects the comprehensive data of takt through the station takt wall, where the abscissa is a sequence of each of the plurality of stations in a certain production line, and the ordinate is a takt duration; the boxplot represents a fluctuation of an actual takt, including a maximum takt, a minimum takt, an upper quartile takt, a lower quartile takt and a median takt within a preset time period; a broken line represents the effective takt mode sequence formed by the effective takt mode of each of the plurality of stations, reflecting a work takt of a station project; the planning takt data sequence (horizontal dashed line) represents a theoretical planning takt of the production line. Generally, in the stations of the same production line, in order to keep a production action of each of the plurality of stations constant, the theoretical planning takt is the same. Therefore, in the example of the present application, a straight line is used to represent the planning takt.

S104: Determining a takt fluctuation status of each of the plurality of stations and a bottleneck station based on the station takt wall.

Specifically, the bottleneck station is a station that affects an overall production efficiency in the production line. Generally, it is manifested that station products accumulate too many. In essence, the station takt is too long, thus limiting the production efficiency of the entire production line. The example of the present application can clearly and accurately reflect the takt fluctuation status of each of the plurality of stations and locate the bottleneck station through the station takt wall. Step S104 specifically includes the following steps.

S1041: Determining the takt fluctuation status of each of the plurality of stations according to the takt boxplot and the planning takt data of each of the plurality of stations.

S1042: Determining whether each of the plurality of stations is a bottleneck station according to the effective takt mode and the planning takt data of each of the plurality of stations.

Specifically, in the station takt wall, a comparison between the takt boxplot and the planning takt data can reflect an actual takt fluctuations of each station, and can also determine an actual takt interval, and determine whether the actual takt reaches the planning takt, to determine whether a median of the actual takt reaches the planning takt, so as to determine whether most of the actual takt meets the requirements of the production line planning takt; by comparing the effective takt mode with the planning takt data, it can be reflected whether each station has reached an ideal takt target, and it can be determined that the station having a highest difference between the effective takt mode and the planning takt data is the bottleneck station of the production line.

In the example of the present application, the takt data of each of the plurality of stations within the preset time period is obtained, the takt boxplot is determined based on the takt data of each of the plurality of stations, and then the material blocking time, the material shortage time and the failure time of each of the plurality of stations in each takt are obtained, the effective takt of each of the plurality of stations is calculated and the effective takt mode is determined, then the planning takt data pre-planned by each of the plurality of stations is obtained, and the station takt wall is obtained based on the takt boxplot, the effective takt mode and the planning takt data of each of the plurality of stations, so that the generation takt fluctuation of each of the plurality of stations and the bottleneck station is determined based on the station takt wall. The example of the present application can accurately reflect the fluctuation range of the station takt, greatly improve the accuracy of the station takt statistical results, and can accurately locate the bottleneck station, meeting the needs of manufacturers to improve production quality and production efficiency and reduce production costs.

In addition, the advantages of the examples of the present application compared with the prior art are that: by combining a concept of boxplot with takt statistics, a fluctuation of actual takt can be accurately represented; by generating the station takt wall, the station takt fluctuation status and the bottleneck status can be represented in multi-dimension.

Figure 3:
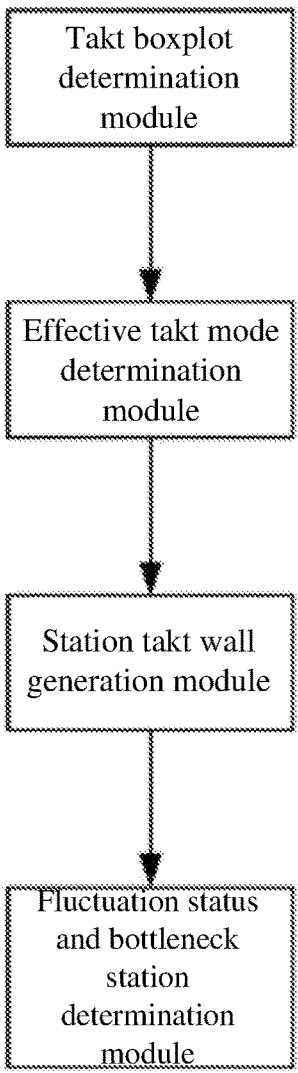
FIG. 3 is a structural block diagram of a system for processing a takt at a station according to an embodiment of the present application.

Referring to FIG. 3, a system for processing a takt at a station according to an example of the present application is shown, which includes: a takt boxplot determination module, an effective takt mode determination module, a station takt wall generation module and a fluctuation status and bottleneck station determination module.

The takt boxplot determination module is used to obtain the takt data within a preset time period indicating a takt of each of the plurality of stations arranged in a predetermined station sequence, and to determine a takt boxplot of each of the plurality of stations based on the takt data.

The effective takt mode determination module is used to obtain a material blocking time, a material shortage time and a failure time in each takt of each of the plurality of stations, and determine an effective takt of each of the plurality of stations based on the takt data, the material blocking time, the material shortage time and the failure time, and determine the effective takt mode based on the effective takt of each of the plurality of stations.

The station takt wall generation module is used to obtain planning takt data indicating a planning takt of each of the plurality of stations, and generate a station takt wall based on the takt boxplot, the effective takt mode and the planning takt data.

The fluctuation status and bottleneck station determination module is used to determine a takt fluctuation status of each of the plurality of stations and a bottleneck station based on the station takt wall.

As a further optional implementation, the effective takt mode determination module includes: a first acquisition unit for acquiring the material blocking time, the material shortage time and the failure time of each of the plurality of stations in each takt; an effective takt calculation unit for obtaining the effective takt by subtracting the material blocking time, the material shortage time and the failure time in a takt data from the takt data; the effective takt mode statistical unit is used to determine an effective takt having a highest frequency in the effective takt of each of the plurality of stations as an effective takt mode of the corresponding station.

Further as an optional example, the fluctuation status and bottleneck station determination module includes: a fluctuation status determination unit for determining the takt fluctuation status of each of the plurality of stations in the station takt wall by comparing the takt boxplot with the planning takt data of each of the plurality of stations; a bottleneck station determination unit for determining whether each of the plurality of stations is a bottleneck station in the station takt wall by comparing the effective takt mode with the planning takt data of each of the plurality of stations.

The contents in the above method examples are all applicable to the present system examples, the specific functions implemented by the present system examples are the same as the above method examples, and the beneficial effects achieved are also the same as those achieved by the above method examples.

Figure 4:
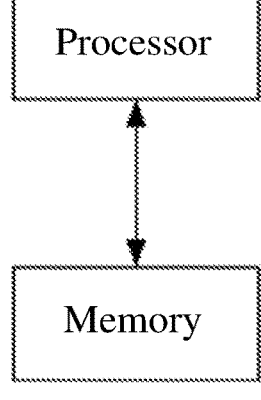
FIG. 4 is a structural block diagram of an apparatus for processing a takt at a station according to an embodiment of the present application.

Referring to FIG. 4, an apparatus for processing a takt at a station according to an example of the present application is shown, including:

at least one processor; and at least one memory for storing at least one program.

When the at least one program is executed by the at least one processor, the at least one processor is caused to implement the method for processing a takt at a station.

The apparatus for processing a takt at a station also includes a display for displaying the generated station takt wall to the user.

The contents in the above method examples are all applicable to the present apparatus examples, the specific functions implemented by the present apparatus examples are the same as the above method examples, and the beneficial effects achieved are also the same as those achieved by the above method examples.

Examples of the present application also provide a non-volatile computer-readable storage medium, in which a processor-executable program is stored, and the processor-executable program is used to execute the above method for processing a takt at a station when executed by the processor.

The non-volatile computer-readable storage medium of the example of the present application can execute the method for processing a takt at a station provided by the method example of the present application, and can execute any combination of implementation steps of the method example, and has the corresponding function and beneficial effects.

The example of the present application also discloses a computer program product or computer program, where the computer program product or computer program includes computer instructions, and the computer instructions are stored in a computer-readable storage medium. A processor of the computer device can read the computer instructions from the computer-readable storage medium, and the processor executes the computer instructions to cause the computer device to perform the method shown in FIG. 1.

In some alternative implementations, the functions/operations noted in the block diagrams may occur out of the order noted in the operational diagrams. For example, two blocks shown in succession may, in fact, be executed substantially concurrently or the blocks may sometimes be executed in the reverse order, depending upon the functionality/operations involved. Furthermore, the examples presented and described in the flowcharts of the present application are provided by way of example in order to provide a more comprehensive understanding of the technology. The disclosed methods are not limited to the operations and logic flows presented herein. Alternative examples are contemplated in which the order of the various operations is altered and in which sub-operations described as part of larger operations are performed independently.

Furthermore, although the application is described in the context of functional modules, it is to be understood that, unless stated to the contrary, one or more of the above-described functions and/or features may be integrated in a single physical apparatus and/or in software modules, or one or more functions and/or features may be implemented in separate physical apparatuses or software modules. It will also be appreciated that a detailed discussion of the actual implementation of each module is not necessary to understand the present application. Rather, given the attributes, functions, and internal relationships of the various functional modules in the apparatus disclosed herein, the actual implementation of the modules will be within the routine skill of the engineer. Accordingly, those skilled in the art, using ordinary skill, can implement the application as set forth in the claims without undue experimentation. It is also to be understood that the specific concepts disclosed are illustrative only and are not intended to limit the scope of the application, which is to be determined by the appended claims along with their full scope of equivalents.

If the above functions are implemented in the form of software functional units and sold or used as independent products, they may be stored in a computer-readable storage medium. Based on this understanding, the technical solution of the present application in essence, or the part that contributes to the prior art or the part of the technical solution can be embodied in the form of a software product. The computer software product is stored in a storage medium, including several instructions used to cause a computer device (which may be a personal computer, a server, or a network device, etc.) to execute all or part of the steps of the above methods in various examples of the present application. The aforementioned storage medium includes: U disk, mobile hard disk, read-only memory (ROM, Read-Only Memory), random access memory (RAM, Random Access Memory), magnetic disk or optical disk and other media that can store program codes.

The logics/or steps represented in flowcharts or otherwise described herein, for example, may be considered an ordered listing of executable instructions for implementing the logical functions, may be embodied in any computer-readable medium, for use with, or in conjunction with, an instruction execution system, apparatus, or device (such as a computer-based system, a system including a processor, or other system that can fetch instructions from and execute instructions from an instruction execution system, device, or apparatus) or equipment. For the purposes of this specification, a "computer-readable medium" can be any apparatus that can contain, store, communicate, propagate, or transport the program for use by or in connection with an instruction execution system, apparatus, or device.

More specific examples (non-exhaustive list) of computer readable media include the following: electrical connections with one or more wiring (electronic apparatuses), portable computer disk cartridges (magnetic apparatuses), random access memory (RAM), Read Only Memory (ROM), Erasable Editable Read Only Memory (EPROM or Flash Memory), Fiber Optic Apparatuses, and Portable Compact Disc Read Only Memory (CDROM). In addition, the computer readable medium may even be paper or other suitable medium on which the above-mentioned program can be printed, as it is possible, for example, by optically scanning the paper or other medium, followed by editing, interpretation or other suitable means if necessary processing is performed to obtain the above program electronically and then stored in computer memory.

It should be understood that various parts of the present application may be implemented in hardware, software, firmware or a combination thereof. In the above-described implementations, various steps or methods may be implemented in software or firmware stored in memory and executed by a suitable instruction execution system. For example, if implemented in hardware, as in another implementation, it can be implemented by any one or a combination of the following techniques known in the art: discrete logic circuits, ASICs with suitable combinational logic gates, programmable Gate Arrays (PGA), Field Programmable Gate Arrays (FPGA), etc.

In the above description of the present specification, reference to the description of the terms of "one implementation/embodiment", "another implementation/embodiment" or "certain implementations/embodiments" etc. means the description in conjunction with the implementations or embodiments. Particular features, structures, materials, or characteristics are included in at least one implementation or example of the present application. In this specification, schematic representations of the above terms do not necessarily refer to the same implementation or example. Furthermore, the particular features, structures, materials or characteristics described may be combined in any suitable manner in any one or more examples or examples.

Although examples of the present application have been shown and described, it will be understood by those of ordinary skill in the art that various changes, modifications, substitutions and alterations can be made in these examples without departing from the principles and spirit of the application. The scope of the application is defined by the claims and their equivalents.

The above is a specific description of the preferred implementation of the present application, but the present application is not limited to the above-mentioned examples, and those skilled in the art can also make various equivalent deformations or replacements on the premise of not violating the spirit of the present application. Equivalent modifications or substitutions are included within the scope defined by the claims of the present application.

What is claimed is:

1. A method for processing a takt at a station in a production line, applied to a controller in the production line, comprising:
obtaining takt data within a preset time period indicating a takt of each of a plurality of stations arranged in a predetermined station sequence;
determining a takt boxplot of each of the plurality of stations based on the takt data;
obtaining a material blocking time, a material shortage time and a failure time of each of the plurality of stations in each takt;
determining an effective takt of each of the plurality of stations based on the takt data, the material blocking time, the material shortage time and the failure time;
determining an effective takt mode of each of the plurality of stations based on the effective takt of each of the plurality of stations;
obtaining planning takt data indicating a planning takt of each of the plurality of stations;
generating a station takt wall based on the takt boxplot, the effective takt mode and the planning takt data, wherein the station takt wall presents a takt boxplot sequence, an effective takt mode sequence and a planning takt data sequence in a predetermined coordinate system, and the predetermined coordinate system is composed of an abscissa representing a station and an ordinate representing a takt duration; and
determining a takt fluctuation status of each of the plurality of stations and a bottleneck station based on the station takt wall, wherein the determining a takt fluctuation status of each of the plurality of stations and a bottleneck station based on the station takt wall, comprises: determining the takt fluctuation status of each of the plurality of stations according to the takt boxplot and the planning takt data of each of the plurality of stations; determining the bottleneck station according to the effective takt mode and the planning takt data;
controlling equipment in the production line according to the takt fluctuation status of each of the plurality of stations and the bottleneck station to adjust and optimize a process of the production line.

2. The method for processing a takt at a station according to claim 1, wherein the obtaining takt data within a preset time period indicating a takt of each of a plurality of stations arranged in a predetermined station sequence comprises:
obtaining production action data comprising a time indicating an initial production action of each of the plurality of stations within the preset time period; and
determining a plurality of pieces of takt data of each of the plurality of stations based on an interval time between adjacent initial production actions.

3. The method for processing a takt at a station according to claim 1, wherein the determining a takt boxplot of each of the plurality of stations based on the takt data comprises:

determining an upper whisker, an upper quartile, a median, a lower quartile and a lower whisker of the takt data of each of the plurality of stations; and determining the takt boxplot of each of the plurality of stations based on the upper whisker, the upper quartile, the median, the lower quartile, and the lower whisker.

4. The method for processing a takt at a station according to claim 1, wherein the determining an effective takt of each of the plurality of stations based on the takt data, the material blocking time, the material shortage time and the failure time comprises:

obtaining the effective takt by subtracting the material blocking time, the material shortage time and the failure time in a takt from the corresponding takt indicated by the takt data.

5. The method for processing a takt at a station according to claim 1, wherein the determining an effective takt mode of each of the plurality of stations based on the effective takt of each of the plurality of stations comprises:

determining an effective takt having a highest frequency in the effective takt of each of the plurality of stations as an effective takt mode of the corresponding station.

6. The method for processing a takt at a station according to claim 1, wherein the generating a station takt wall based on the takt boxplot, the effective takt mode and the planning takt data comprises:

determining the takt boxplot sequence based on the takt boxplot of each of the plurality of stations and the station sequence;

determining the effective takt mode sequence based on the effective takt mode of each of the plurality of stations and the station sequence;

determining the planning takt data sequence based on the planning takt data of each of the plurality of stations and the station sequence; and generating a station takt wall in the predetermined coordinate system based on the takt boxplot sequence, the effective takt mode sequence and the planning takt data sequence.

7. The method for processing a takt at a station according to claim 1, wherein the determining the takt fluctuation status of each of the plurality of stations according to the takt boxplot and the planning takt data of each of the plurality of stations comprises:

determining the takt fluctuation status of each of the plurality of stations in the station takt wall by comparing the takt boxplot with the planning takt data of each of the plurality of stations.

8. The method for processing a takt at a station according to claim 1, wherein the determining the bottleneck station according to the effective takt mode and the planning takt data comprises:

determining whether each of the plurality of stations is a bottleneck station in the station takt wall by comparing the effective takt mode with the planning takt data of each of the plurality of stations.

9. A non-transitory computer-readable storage medium on which processor-executable instructions are stored, wherein the processor-executable instructions, when executed by a processor, are used to execute the method for processing a takt at a station according to claim 1.

10. A apparatus for processing a takt at a station in a production line, applied to a controller in the production line, the controller comprising:

at least one processor; and at least one memory storing at least one program, wherein when the at least one program is executed by the at least one processor, the at least one processor is caused to implement a method for processing a takt at a station, comprising:

obtaining takt data within a preset time period indicating a takt of each of a plurality of stations arranged in a predetermined station sequence;

determining a takt boxplot of each of the plurality of stations based on the takt data;

obtaining a material blocking time, a material shortage time and a failure time of each of the plurality of stations in each takt;

determining an effective takt of each of the plurality of stations based on the takt data, the material blocking time, the material shortage time and the failure time;

determining an effective takt mode of each of the plurality of stations based on the effective takt of each of the plurality of stations;

obtaining planning takt data indicating a planning takt of each of the plurality of stations;

generating a station takt wall based on the takt boxplot, the effective takt mode and the planning takt data, wherein the station takt wall presents a takt boxplot sequence, an effective takt mode sequence and a planning takt data sequence in a predetermined coordinate system, and the predetermined coordinate system is composed of an abscissa representing a station and an ordinate representing a takt duration; and determining a takt fluctuation status of each of the plurality of stations and a bottleneck station based on the station takt wall, wherein the determining a takt fluctuation status of each of the plurality of stations and a bottleneck station based on the station takt wall, comprises: determining the takt fluctuation status of each of the plurality of stations according to the takt boxplot and the planning takt data of each of the plurality of stations; determining the bottleneck station according to the effective takt mode and the planning takt data;

controlling equipment in the production line according to the takt fluctuation status of each of the plurality of stations and the bottleneck station to adjust and optimize a process of the production line.

11. The apparatus for processing a takt at a station according to claim 10, wherein the obtaining takt data within a preset time period indicating a takt of each of a plurality of stations arranged in a predetermined station sequence comprises:

obtaining production action data comprising a time indicating an initial production action of each of the plurality of stations within the preset time period; and determining a plurality of pieces of takt data of each of the plurality of stations based on an interval time between adjacent initial production actions.

12. The apparatus for processing a takt at a station according to claim 10, wherein the determining a takt boxplot of each of the plurality of stations based on the takt data comprises:

determining an upper whisker, an upper quartile, a median, a lower quartile and a lower whisker of the takt data of each of the plurality of stations; and determining the takt boxplot of each of the plurality of stations based on the upper whisker, the upper quartile, the median, the lower quartile, and the lower whisker.

13. The apparatus for processing a takt at a station according to claim 10, wherein the determining an effective takt of each of the plurality of stations based on the takt data, the material blocking time, the material shortage time and the failure time comprises:

obtaining the effective takt by subtracting the material blocking time, the material shortage time and the failure time in a takt from the corresponding takt indicated by the takt data.

14. The apparatus for processing a takt at a station according to claim 10, wherein the determining an effective takt mode of each of the plurality of stations based on the effective takt of each of the plurality of stations comprises:

determining an effective takt having a highest frequency in the effective takt of each of the plurality of stations as an effective takt mode of the corresponding station.

15. The apparatus for processing a takt at a station according to claim 10, wherein the generating a station takt wall based on the takt boxplot, the effective takt mode and the planning takt data comprises:

determining the takt boxplot sequence based on the takt boxplot of each of the plurality of stations and the station sequence;

determining the effective takt mode sequence based on the effective takt mode of each of the plurality of stations and the station sequence;

determining the planning takt data sequence based on the planning takt data of each of the plurality of stations and the station sequence; and generating a station takt wall in the predetermined coordinate system based on the takt boxplot sequence, the effective takt mode sequence and the planning takt data sequence.

16. The apparatus for processing a takt at a station according to claim 9, wherein the determining the takt fluctuation status of each of the plurality of stations according to the takt boxplot and the planning takt data of each of the plurality of stations comprises:

determining the takt fluctuation status of each of the plurality of stations in the station takt wall by comparing the takt boxplot with the planning takt data of each of the plurality of stations.

17. The apparatus for processing a takt at a station according to claim 10, wherein the determining the bottleneck station according to the effective takt mode and the planning takt data comprises:

determining whether each of the plurality of stations is a bottleneck station in the station takt wall by comparing the effective takt mode with the planning takt data of each of the plurality of stations.

* * * * *